US008667610B2

(12) United States Patent
Chen et al.

(10) Patent No.: US 8,667,610 B2
(45) Date of Patent: Mar. 4, 2014

(54) PORTABLE COMPUTER AND CHARGING METHOD THEREOF

(75) Inventors: Pi-Chi Chen, Luzhou (TW); Wei-Ting Yen, Taipei (TW); Cheng-Lu Lin, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 616 days.

(21) Appl. No.: 12/604,553

(22) Filed: Oct. 23, 2009

(65) Prior Publication Data

US 2010/0268970 A1 Oct. 21, 2010

(30) Foreign Application Priority Data

Apr. 17, 2009 (CN) .................................. 98 1 12874

(51) Int. Cl.
*G06F 1/26* (2006.01)

(52) U.S. Cl.
USPC ...... 726/34; 713/1; 713/2; 713/300; 713/340; 726/35; 726/36; 709/203

(58) Field of Classification Search
USPC .................................... 726/34; 713/300, 340
See application file for complete search history.

(56) References Cited

U.S. PATENT DOCUMENTS 5,955,869 A * 9/1999 Rathmann ..................... 320/132
6,058,443 A * 5/2000 Gulick .......................... 710/312
6,112,414 A * 9/2000 Andis et al. ..................... 30/231
6,463,545 B1 * 10/2002 Fisher et al. .................. 713/340
7,542,091 B2 * 6/2009 Bean et al. .................... 348/372
7,861,113 B2 * 12/2010 Wang .............................. 714/11
7,941,865 B2 * 5/2011 Seman et al. ................... 726/34
8,032,279 B2 * 10/2011 Rogers et al. ................... 701/36
2003/0182476 A1 * 9/2003 Kuo et al. ......................... 710/8
2005/0056698 A1 * 3/2005 Cummings et al. ........... 235/386
2005/0062612 A1 * 3/2005 Smith et al. ................ 340/636.1
2005/0171711 A1 * 8/2005 Tung .............................. 702/63
2006/0248363 A1 * 11/2006 Chen et al. .................... 713/300
2006/0259801 A1 * 11/2006 Chu et al. ...................... 713/300
2007/0006004 A1 * 1/2007 Kurts et al. ................... 713/320
2008/0001078 A1 * 1/2008 Pittel et al. ................. 250/252.1
2008/0146265 A1 * 6/2008 Valavi ........................ 455/550.1

(Continued)

FOREIGN PATENT DOCUMENTS

TW I270767 1/2007

OTHER PUBLICATIONS

Vaccaro et al., "Internal Resistance: Harbinger of Capacity Loss in Starved Electrolyte Sealed Lead Acid Batteries", 1987.*

*Primary Examiner* — Krista M. Zele
*Assistant Examiner* — Ondrej Vostal
(74) *Attorney, Agent, or Firm* — Rabin & Berdo, P.C.

(57) ABSTRACT

A portable computer and a charging method thereof are provided. The portable computer includes a charge integrated circuit (IC), a basic input/output system (BIOS) and embedded controller (EC), a south bridge chip, a north bridge chip and a central processing unit (CPU). After the portable computer is connected to a battery, the BIOS and EC controls the south bridge chip to read a sealed security bit of the battery and checks whether the sealed security bit equals a default value. The BIOS and EC controls the south bridge chip to read a battery data of the battery if the sealed security bit equals default value. The BIOS and EC controls the charge IC via the south bridge chip to charge the battery according to the battery data. The CPU controls the south bridge chip and the north bridge chip.

16 Claims, 2 Drawing Sheets

START connect a battery to a portable computer — 210 check whether a sealed security (SS) bit of the battery equals a default value — 220

YES read a battery data of the battery if the sealed security bit equals the default value — 230 charge the battery according to the battery data — 240

END

(56) References Cited

U.S. PATENT DOCUMENTS

2008/0228959 A1* 9/2008 Wang .............................. 710/22
2008/0231449 A1* 9/2008 Moshfeghi ................. 340/572.1
2008/0278006 A1* 11/2008 Gottlieb et al. ................. 307/66
2009/0043203 A1* 2/2009 Pelissier et al. ............... 600/446
2009/0207600 A1* 8/2009 Frick ............................ 362/202
2009/0292372 A1* 11/2009 Burg et al. ........................ 700/1
2010/0045243 A1* 2/2010 Mizuno et al. ................ 320/162
2010/0117579 A1* 5/2010 Culbert et al. ................ 318/471

* cited by examiner

PORTABLE COMPUTER AND CHARGING METHOD THEREOF

This application claims the benefit of Taiwan application Serial No. 98112874, filed Apr. 17, 2009, the subject matter of which is incorporated herein by reference.

BACKGROUND OF THE INVENTION

1. Field of the Invention

The invention relates in general to a portable computer and a charging method thereof, and more particularly to a portable computer capable of detecting the seal status of the battery so as to maintain the normal charge of the battery and a charging method thereof.

2. Description of the Related Art

The notebook computer is portable, and is powered by the battery installed therein to when not connected to any external power. Therefore, to keep the power supplied by the battery continuous and stable is essential to the operation of the system of the notebook computer. Currently, a battery used in notebook computer by the name of smart battery is provided. The smart battery has an advantage, that is, the smart battery provides battery data. The battery data include static data and dynamic data, wherein examples of static data includes manufacture name, device name, the device chemistry, serial number and manufacture data, and examples of dynamic data include relative state of charge (RSOC), charging current, charging voltage, current, voltage, temperature and battery status. The embedded controller (EC) of notebook computer reads static data only at the moment when the battery is plugged into notebook computer, and does not read any static data ever since. To the contrary, the EC still keep reading dynamic data after the battery is plugged into notebook computer.

The notebook computer obtains the relative state of charge of the smart battery according to the battery data. Thus, the notebook computer performs power management according to the obtained RSOC data and optimizes the utilization of the power utilization of the computer system according to the RSOC of the smart battery. For example, if the user does not emit any instruction or command to the host of the computer via the keyboard or other peripheral input/output device of the computer for a period of time, then the notebook computer will shut the display, the hard disc or other circuit elements according to the predetermined settings to save power. Or, when the RSOC comes down to a certain level, the notebook computer will decrease the brightness of the display frame so as to reduce power consumption and provide a warning message to remind the user that the smart battery needs to be charged. Or, when the RSOC of the smart battery has reached an extremely low level, data will be saved to a memory or hard disc, and the entire system will be shut down.

The smart battery has a security seal which must be sealed before the battery is delivered from the factory, otherwise when the smart battery is charged, the original battery data will be changed, causing abnormal operation to the battery and severely affecting the normal operation of the notebook computer.

SUMMARY OF THE INVENTION

The invention is directed to a portable computer and a charging method thereof. The battery is charged only after the security seal of the battery is confirmed as being sealed, so the original battery data will not be changed. Thus, the normal operations of the battery as well as the notebook computer are maintained.

According to a first aspect of the present invention, a portable computer is provided. The portable computer includes a charge integrated circuit (IC), a basic input/output system (BIOS) and embedded controller (EC), a south bridge chip, a north bridge chip and a central processing unit (CPU). After the portable computer is connected to a battery, the BIOS and EC controls the south bridge chip to read a sealed security bit of the battery and checks whether the sealed security bit equals a default value. The BIOS and EC controls the south bridge chip to read a battery data of the battery if the sealed security bit equals the default value. The BIOS and EC controls the charge IC via the south bridge chip to charge the battery according to the battery data. The CPU controls the south bridge chip and the north bridge chip.

According to a second aspect of the present invention, a charging method is provided. The charging method includes the following steps of connecting the battery to the portable computer, checking whether the sealed security bit of the battery equals a default value, reading a battery data of the battery if the sealed security bit equals the default value, and charging the battery according to the battery data.

The invention will become apparent from the following detailed description of the preferred but non-limiting embodiments. The following description is made with reference to the accompanying drawings.

DETAILED DESCRIPTION OF THE INVENTION

Figure 1:
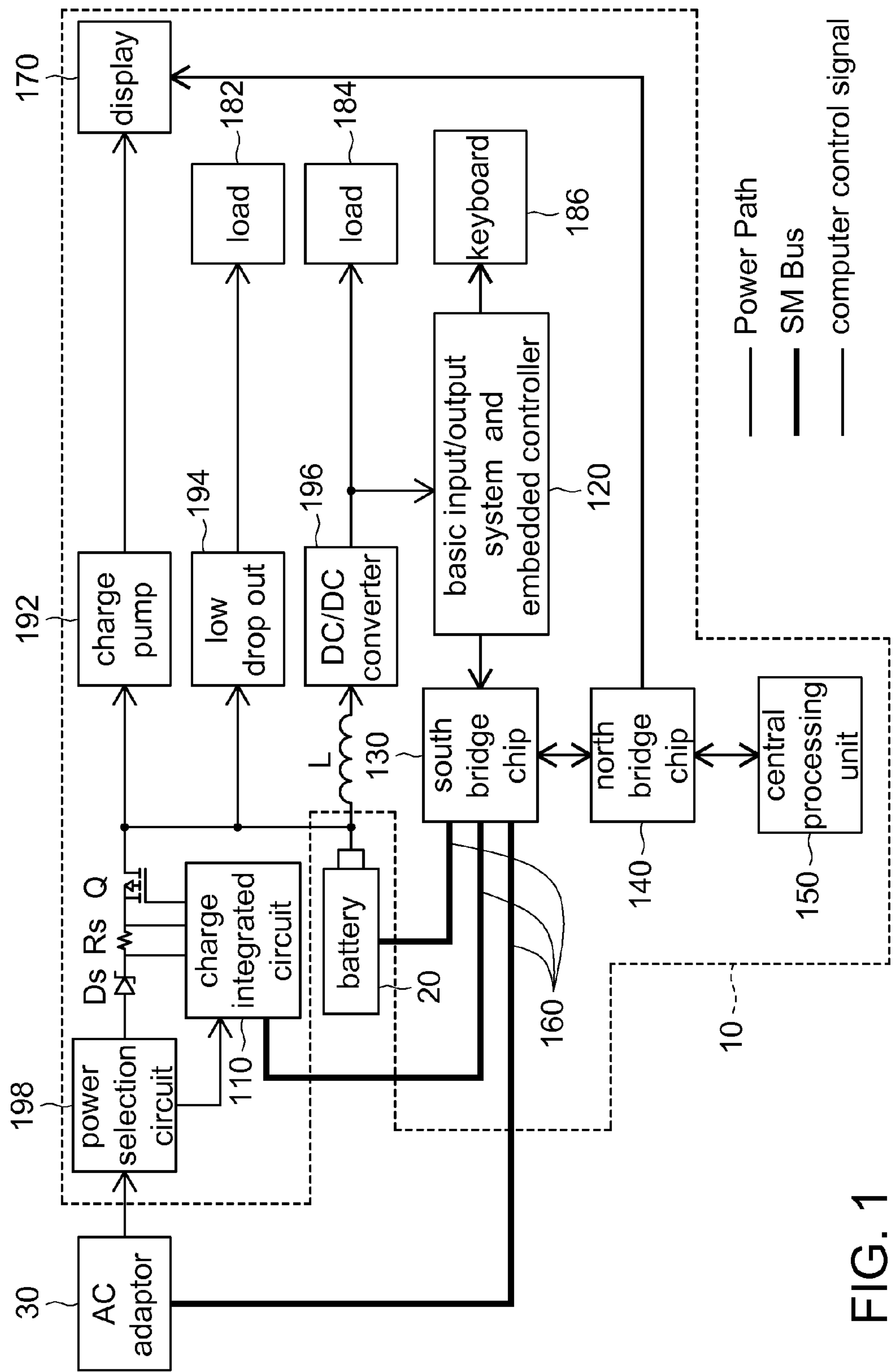
FIG. 1 shows is a block diagram of a portable computer according to a preferred embodiment of the invention.

Referring to FIG. 1, a block diagram of a portable computer according to a preferred embodiment of the invention is shown. The portable computer 10 receives an external AC power via an AC adaptor 30 to charge the battery 20. The portable computer 10 is a notebook computer or a tablet PC for example. The battery 20, which provides necessary power to the portable computer 10, is a smart battery for example. The portable computer 10 includes a charge integrated circuit (IC) 110, a basic input/output system (BIOS) and embedded controller (EC) 120, a south bridge chip 130, a north bridge chip 140, a central processing unit (CPU) 150, a system management bus (SMBus) 160, a power selection circuit 198, a Schottary diode Ds, a sense resistor Rs, a charge FET Q, an inductance L, a charge pump 192, a low drop out (LDO) 194, a DC/DC converter 196, a load 182, a load 184, a keyboard 186 and a display 170. The keyboard 186 is coupled to the BIOS and EC 120.

When the AC adaptor 30 is coupled to the portable computer 10, the power selection circuit 198 informs the charge IC 110 to conduct the charge FET Q, so that the external AC power, being converted by the AC adaptor 30, is able to charge the battery 20 via the power selection circuit 198, the Schottary diode Ds, the sense resistor Rs, and the charge FET Q.

The charge pump 192 is used for adjusting and outputting the power to the display 170. The load 184 is an audio frequency module, a wireless radio frequency module or a sensor for example. The load 186 is a fan, a memory or a core voltage supply circuit Vcore of a CPU for example. The low drop out 194 is used for adjusting and outputting the power to the load 182. The DC/DC converter 196 is electrically connected to the inductance L for adjusting and outputting the inductance to the load 184.

The south bridge chip 130 communicates with the AC adaptor 30, the charge IC 110 and the battery 20 via the system management bus 160. The battery 20 emits information such as the required charging voltage, the required charging current, status and alert via the system management bus 160. The portable computer 10 inquires the estimated working duration of the battery 20 under the current work load via the system management bus 160. The system management bus 160 improves the power management of the portable computer 10, increases the reliability of the battery 20, prolongs the duration of the battery 20, and assures the capacity of the battery 20.

The BIOS and EC 120 preferably determines whether to stop charging the battery 20 according to a sealed security (SS) bit of the battery 20. Or, the BIOS and EC 120 determines whether to reduce a working frequency of the CPU according to a sealed security bit of the battery 20. Or, the BIOS and EC 120 determines whether to correspondingly display a seal status on a display according to a sealed security bit of the battery 20. Examples of the indicating device include display, light emitting diode and buzzer. In the disclosure of the embodiments below, the indicating device is exemplified by a display 170.

After the portable computer 10 is connected to the battery 20, the BIOS and EC 120 checks whether a sealed security (SS) bit of the battery 20 equals a default value. The sealed security bit changes according to whether the security seal of the battery 20 is sealed. For example, if the security seal of the battery 20 is sealed, then the sealed security bit equals the default value. To the contrary, if the security seal of the battery 20 is not sealed, then the sealed security bit does not equal the default value. The default value is 1 for example.

If the sealed security bit equals the default value, then the EC 120 reads a battery data of the battery 20. The battery data includes a static data and a dynamic data, wherein examples of the static data include manufacture name, device name, device chemistry, serial number and manufacture data, and examples of the dynamic data include relative state of charge (RSOC), charging current, charging voltage, current, voltage, temperature and battery status.

The CPU 150 controls the south bridge chip 130 and the north bridge chip 140. The BIOS and EC 120 controls the south bridge chip 130 to read a sealed security bit of the battery 20 and checks whether the sealed security bit equals a default value. If the sealed security bit equals the default value, then the BIOS and EC 120 controls the south bridge chip 130 to read a battery data of the battery, and controls the charge IC 110 to charge the battery 20 via the south bridge chip 130 according to the battery data. To the contrary, if the sealed security bit does not equal the default value, the BIOS and EC 120 controls the charge IC 110 via the south bridge chip 130 to forbid charging the battery 20.

Only after the security seal of the battery 20 is confirmed as being sealed will the BIOS and EC 120 controls the charge IC 110 via the south bridge chip 130 to charge the battery 20, so the original battery data will not be changed. Thus, the normal operations of the battery 20 as well as the notebook computer 10 are maintained.

Furthermore, if the sealed security bit does not equal the default value, then the BIOS and EC 120 controls the south bridge chip 130 to reduce the working frequency of the CPU 150. The south bridge chip 130, being electrically connected to the lead STPCLK# of the CPU, reduces the working frequency of the CPU 150 via the lead STPCLK# to reduce power consumption.

To allow the user to intuitively obtain the seal status of the battery 20, the BIOS and EC 120 correspondingly indicates the seal status of the battery 20 on the display 170 according to the sealed security bit. Thus, when the battery 20 is sealed and cannot be charged normally, the user can promptly obtain information from the display 170 and work out a solution.

Figure 2:
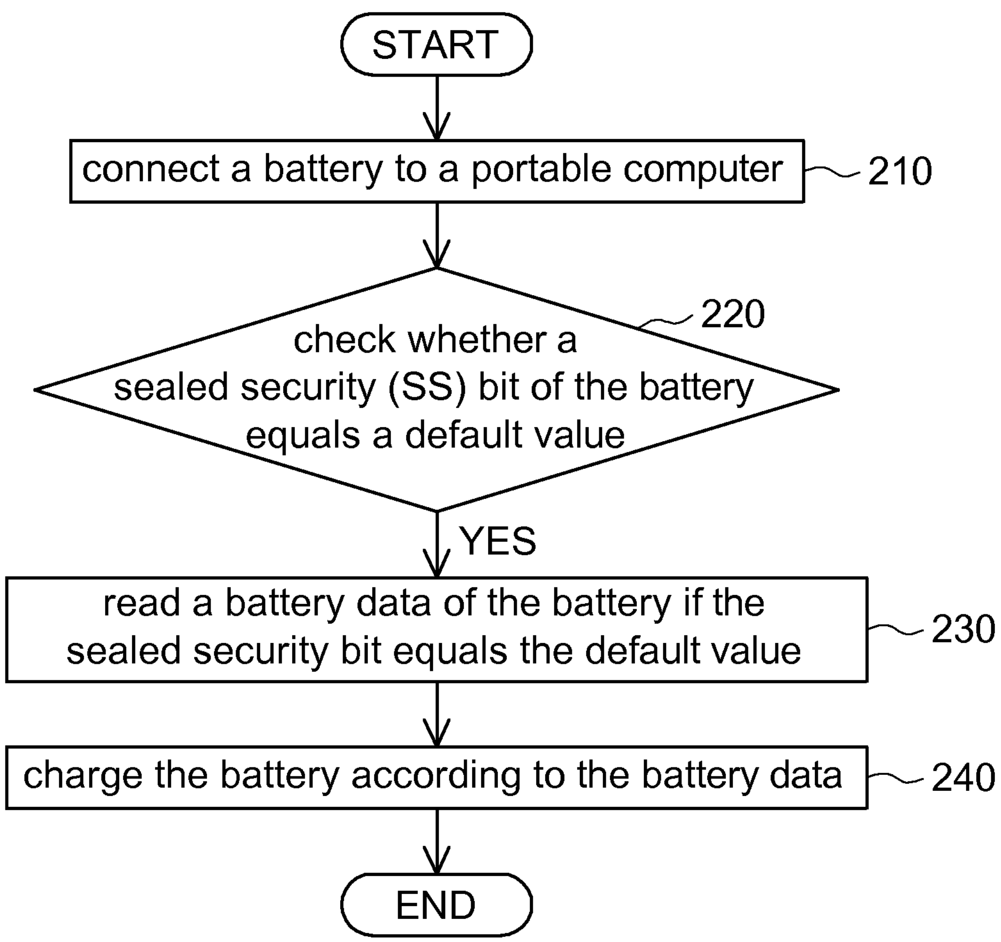
FIG. 2 shows a flowchart of a charging method according to a preferred embodiment of the invention.

Referring to FIG. 2, a flowchart of a charging method according to a preferred embodiment of the invention is shown. The charging method is used for charging a battery 20 of a portable computer 10 disclosed above. The charging method further includes the following steps. Firstly, the method begins at step 210, the battery 20 is connected to the portable computer 10. Next, the method proceeds to step 220, whether the sealed security bit of the battery 20 equals a default value is checked by a BIOS and EC 120, and if the sealed security bit equals the default value, then the method proceeds to step 230, a south bridge chip 130 is controlled to read a battery data of the battery 20 by the BIOS and EC 120. Then, the method proceeds to step 240, the charge IC 110 is controlled by the BIOS and EC 120 via the south bridge chip 130 to charge the battery 20 according to the battery data.

The portable computer and the charging method thereof disclosed in the above embodiments of the invention have many advantages exemplified below:

Firstly, only after the security seal of the battery is sealed will the portable computer charge the battery, so the original battery data will not be changed.

Secondly, as the original battery data will not be changed by mistake, the normal operations of the battery as well as the notebook computer are maintained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, comprising:

a charge integrated circuit (IC);

a south bridge chip;

a basic input/output system (BIOS) and embedded controller (EC), wherein after the portable computer is connected to a battery, the BIOS and EC control the south bridge chip to read a sealed security (SS) bit of the battery and check whether the sealed security bit equals a default value to confirm that a security seal of the battery is sealed such that original battery data of the battery will not be changed, and if the sealed security bit equals the default value, then the BIOS and EC control the south bridge chip to read battery data of the battery, and control the charge IC via the south bridge chip to charge the battery according to the battery data, if the sealed security bit does not equal the default value, then the BIOS and EC controls the south bridge chip to reduce a working frequency of a central processing unit (CPU) used for controlling the south bridge chip and a north bridge chip;

a north bridge chip; and a central processing unit (CPU) used for controlling the south bridge chip and the north bridge chip;

wherein the battery data includes static data and dynamic data, the static data include manufacture and device information, and the dynamic data include relative state of charge (RSOC) and battery status.

2. The portable computer according to claim 1, wherein if the security seal of the battery is not sealed, then the sealed security bit does not equal the default value.

3. The portable computer according to claim 1, wherein if the sealed security bit does not equal the default value, the BIOS and EC control the charge IC via the south bridge chip to forbid charging the battery.

4. The portable computer according to claim 1, wherein if the sealed security bit does not equal the default value, the BIOS and EC control the south bridge chip to reduce a working frequency of the CPU.

5. The portable computer according to claim 1, further comprising:

an indicating device, wherein the BIOS and EC correspondingly indicate a seal status of the battery on the indicating device according to the sealed security bit.

6. The portable computer according to claim 5, wherein the indicating device is a display.

7. The portable computer according to claim 5, wherein the indicating device is a light emitting diode (LED).

8. The portable computer according to claim 5, wherein the indicating device is a buzzer.

9. A charging method, comprising:

connecting a battery to a portable computer;

checking whether a sealed security (SS) bit of the battery equals a default value to confirm that a security seal of the battery is sealed such that original battery data of the battery will not be changed;

reading battery data of the battery if the sealed security bit equals the default value; and charging the battery according to the battery data;

wherein if the sealed security bit does not equal the default value, then a basic input/output system (BIOS) and embedded controller (EC) of the portable computer controls a south bridge chip of the portable computer to reduce a working frequency of a central processing unit (CPU) used for controlling the south bridge chip, the battery data includes static data and dynamic data, the static data include manufacture and device information, and the dynamic data include relative state of charge (RSOC) and battery status.

10. The portable computer according to claim 9, wherein in the checking step, if the security seal of the battery is not sealed, then the sealed security bit does not equal the default value.

11. The portable computer according to claim 9, further comprising:

forbidding charging the battery if the sealed security bit does not equal the default value.

12. The portable computer according to claim 9, further comprising:

reducing a working frequency of a CPU of the portable computer if the sealed security bit does not equal the default value.

13. The portable computer according to claim 9, further comprising:

indicating a seal status of the battery according to the sealed security bit.

14. The charging method according to claim 13, wherein in the indicating step, the seal status is indicated by a display.

15. The charging method according to claim 13, wherein in the indicating step, the seal status is indicated by a light emitting diode.

16. The charging method according to claim 13, wherein in the indicating step, the seal status is indicated by a buzzer.

* * * * *